United States Patent [19]
Le Cornec et al.

[11] Patent Number: 5,818,468
[45] Date of Patent: Oct. 6, 1998

[54] DECODING VIDEO SIGNALS AT HIGH SPEED USING A MEMORY BUFFER

[75] Inventors: Yann Le Cornec, Fremont; Julien T. Nguyen, Redwood City; Bernard G. Fraenkel, Oakland, all of Calif.

[73] Assignee: Sigma Designs, Inc., Fremont, Calif.

[21] Appl. No.: 658,994

[22] Filed: Jun. 4, 1996

[51] Int. Cl.⁶ .................................................. G06F 13/16
[52] U.S. Cl. .......................... 345/521; 345/501; 345/507; 711/151; 348/718
[58] Field of Search .................... 345/501, 502, 345/507, 509, 520, 521, 202, 515, 516; 711/100, 111, 150, 151; 348/513, 514, 497, 714–716, 718

[56] References Cited

U.S. PATENT DOCUMENTS

| | | | |
|---|---|---|---|
| 3,846,762 | 11/1974 | Gregory et al. | 340/172.5 |
| 3,908,080 | 9/1975 | Broadbent | 178/6.6 R |
| 3,947,826 | 3/1976 | Bockwoldt | 340/173 |
| 4,181,933 | 1/1980 | Benysek | 711/151 |
| 4,353,057 | 10/1982 | Bernet et al. | 340/347 |
| 4,394,650 | 7/1983 | Long et al. | 340/728 |
| 4,425,581 | 1/1984 | Schweppe et al. | 358/148 |
| 4,498,098 | 2/1985 | Stell | 358/22 |
| 4,523,227 | 6/1985 | Hurst | 358/105 |
| 4,528,561 | 7/1985 | Kitamura | 340/745 |
| 4,580,165 | 4/1986 | Patton et al. | 358/148 |
| 4,587,633 | 5/1986 | Wang et al. | 364/900 |
| 4,626,837 | 12/1986 | Priestly | 340/723 |
| 4,628,479 | 12/1986 | Borg et al. | 364/900 |
| 4,675,612 | 6/1987 | Adams et al. | 328/63 |
| 4,680,622 | 7/1987 | Barnes et al. | 358/22 |
| 4,684,936 | 8/1987 | Brown et al. | 340/721 |
| 4,713,621 | 12/1987 | Nakamura et al. | 328/55 |
| 4,757,310 | 7/1988 | Katsura et al. | 340/798 |
| 4,779,210 | 10/1988 | Katsura et al. | 364/521 |
| 4,811,205 | 3/1989 | Normington et al. | 364/900 |
| 4,814,879 | 3/1989 | McNeely | 358/148 |

(List continued on next page.)

FOREIGN PATENT DOCUMENTS

| | | | |
|---|---|---|---|
| 0 384 257 | 8/1990 | European Pat. Off. | G09G 1/16 |
| 0 384 419 | 8/1990 | European Pat. Off. | G09G 1/16 |
| 1175374 | 11/1989 | Japan | H04N 5/265 |

OTHER PUBLICATIONS

Brunhoff, Todd; "VEX Provides Mechanism for Integrating Graphics and Video"; Computer Technology Review; 10 Nov. 1990; No. 1, pp. 107–111.

*Primary Examiner*—Kee M. Tung
*Attorney, Agent, or Firm*—Steven A. Swernofsky

[57] ABSTRACT

A method for decoding and displaying video signals using a memory buffer, in which a speed of a write operation for a memory buffer is adjusted to avoid overtaking a read operation for the same memory buffer. A display controller and a video MPEG engine contend for access to a DRAM memory buffer controller, and have their relative priorities set so that the video MPEG engine operates to write to the memory buffer at a relatively slow speed during a time period when the display controller is reading from that same memory buffer, and to write to the memory buffer at a relatively fast speed during a time period when the display controller is not reading from the memory buffer. The relatively slow speed is preferably much slower than the reading speed of the display controller, while the relatively fast speed is preferably much faster than the display controller. The DRAM memory buffer controller has a limited memory transfer bandwidth; the display controller and the video MPEG engine are operated at speeds which completely occupy that bandwidth, with the display controller given higher priority. Thus, while the display controller is reading from the memory buffer, the video MPEG engine is constrained to operate at a relatively slow speed, and is unable to overtake the display controller, but while the display controller is not reading from the memory buffer (e.g., during a vertical retrace interval), the video MPEG engine is able to operate at a relatively high speed, and is able to write an entire frame to the memory buffer in a relatively short time.

18 Claims, 3 Drawing Sheets

U.S. PATENT DOCUMENTS

| | | | |
|---|---|---|---|
| 4,862,392 | 8/1989 | Steiner | 364/522 |
| 4,870,406 | 9/1989 | Gupta et al. | 340/70 |
| 4,876,600 | 10/1989 | Pietzsch et al. | 358/183 |
| 4,891,631 | 1/1990 | Fredlund et al. | 340/709 |
| 4,905,189 | 2/1990 | Brunolli | 364/900 |
| 4,907,186 | 3/1990 | Truong | 358/183 |
| 4,916,301 | 4/1990 | Mansfield et al. | 340/747 |
| 4,947,257 | 8/1990 | Fernandez et al. | 358/183 |
| 4,947,342 | 8/1990 | Katsura et al. | 364/518 |
| 4,951,229 | 8/1990 | DiNicola et al. | 364/521 |
| 4,953,101 | 8/1990 | Kelleher et al. | 364/518 |
| 4,994,912 | 2/1991 | Lumelsky et al. | 358/140 |
| 5,027,212 | 6/1991 | Marlton et al. | 358/183 |
| 5,046,023 | 9/1991 | Katsura et al. | 364/518 |
| 5,065,346 | 11/1991 | Kawai et al. | 395/128 |
| 5,097,257 | 3/1992 | Clough et al. | 340/814 |
| 5,099,331 | 3/1992 | Truong | 358/183 |
| 5,111,292 | 5/1992 | Kuriacose et al. | 358/133 |
| 5,111,409 | 5/1992 | Gasper et al. | 395/152 |
| 5,122,875 | 6/1992 | Raychaudhuri et al. | 358/133 |
| 5,138,307 | 8/1992 | Tatsumi | 340/721 |
| 5,151,875 | 9/1992 | Sato | 364/784 |
| 5,157,716 | 10/1992 | Naddor et al. | 379/92 |
| 5,168,356 | 12/1992 | Acampora et al. | 358/133 |
| 5,185,665 | 2/1993 | Okura et al. | 358/183 |
| 5,191,410 | 3/1993 | McCalley et al. | 358/86 |
| 5,191,548 | 3/1993 | Balkanski et al. | 364/725 |
| 5,196,946 | 3/1993 | Balkanski et al. | 358/433 |
| 5,208,745 | 5/1993 | Quentin et al. | 364/188 |
| 5,218,431 | 6/1993 | Gleicher et al. | 358/13 |
| 5,220,312 | 6/1993 | Lumelsky et al. | 340/721 |
| 5,231,492 | 7/1993 | Dangi et al. | 358/143 |
| 5,243,447 | 9/1993 | Bodenkamp et al. | 345/133 |
| 5,253,078 | 10/1993 | Balkanski et al. | 358/426 |
| 5,270,832 | 12/1993 | Balkanski et al. | 358/432 |
| 5,289,276 | 2/1994 | Siracusa et al. | 348/467 |
| 5,309,111 | 5/1994 | McNeely et al. | 328/133 |
| 5,309,567 | 5/1994 | Mizukami | 395/325 |
| 5,329,630 | 7/1994 | Baldwin | 395/425 |
| 5,333,261 | 7/1994 | Guttag et al. | 395/162 |
| 5,341,318 | 8/1994 | Balkanski et al. | 364/725 |
| 5,371,861 | 12/1994 | Keener et al. | 395/325 |
| 5,379,356 | 1/1995 | Purcell et al. | 382/56 |
| 5,392,239 | 2/1995 | Margulis et al. | 365/189.01 |
| 5,397,853 | 3/1995 | Koguchi | 84/609 |
| 5,402,147 | 3/1995 | Chen et al. | 345/115 |
| 5,406,306 | 4/1995 | Siann et al. | 345/115 |
| 5,416,749 | 5/1995 | Lai | 365/240 |
| 5,426,756 | 6/1995 | Shyi et al. | 395/425 |
| 5,434,913 | 7/1995 | Tung et al. | 379/202 |
| 5,446,501 | 8/1995 | Takemoto et al. | 348/620 |
| 5,450,542 | 9/1995 | Lehman et al. | 395/162 |
| 5,450,544 | 9/1995 | Dixon et al. | 395/164 |
| 5,471,576 | 11/1995 | Yee | 395/154 |
| 5,611,041 | 3/1997 | Bril et al. | 345/507 |
| 5,673,416 | 9/1997 | Chee et al. | 711/151 |

DECODING VIDEO SIGNALS AT HIGH SPEED USING A MEMORY BUFFER

BACKGROUND OF THE INVENTION

1. Field of the Invention

This invention relates to decoding video signals at high speed using a memory buffer.

2. Description of Related Art

In computer systems and other digital systems for decoding and displaying video signals, such as decoding and displaying pictures represented by an MPEG video stream, it is generally necessary to use a memory buffer to record the results of decoding MPEG picture frames. Limited memory generally makes it necessary to overwrite one or more memory buffers.

One problem which has arisen in the art is that overwriting a memory buffer while reading from that same buffer can cause a visual phenomenon called "tearing" when the operation of writing to the buffer overtakes the operation of reading to the buffer.

One method of the prior art has been to restrict the video display to a relatively small display size, also known as a "partial screen" display. This allows the reading operation to proceed much more quickly, thus providing a longer time in which the writing operation may be performed without tearing. While this method of the prior art achieves the goal of eliminating tearing, it has the drawback that the video display is restricted to a relatively small size, a drawback which is considered serious by many viewers.

Accordingly, it would be advantageous to provide an improved method of decoding video signals at high speed using a memory buffer, which does not produce tearing and does not suffer the drawbacks of the prior art.

SUMMARY OF THE INVENTION

The invention provides a method for decoding and displaying video signals using a memory buffer, in which a speed of a write operation for a memory buffer is adjusted to avoid overtaking a read operation for the same memory buffer. In a preferred embodiment, a display controller and a video MPEG engine contend for access to a DRAM memory buffer controller, and have their relative priorities set so that the video MPEG engine operates to write to the memory buffer at a relatively slow speed during a time period when the display controller is reading from that same memory buffer, and to write to the memory buffer at a relatively fast speed during a time period when the display controller is not reading from the memory buffer. The relatively slow speed is preferably much slower than the reading speed of the display controller, while the relatively fast speed is preferably much faster than the display controller.

In a preferred embodiment, the DRAM memory buffer controller has a limited memory transfer bandwidth; the display controller and the video MPEG engine are operated at speeds which completely occupy that bandwidth, with the display controller given higher priority. Thus, while the display controller is reading from the memory buffer, the video MPEG engine is constrained to operate at a relatively slow speed, and is unable to overtake the display controller, but while the display controller is not reading from the memory buffer (e.g., during a vertical retrace interval), the video MPEG engine is able to operate at a relatively high speed, and is able to write an entire frame to the memory buffer in a relatively short time.

DESCRIPTION OF THE PREFERRED EMBODIMENT

Inventions described herein may be made or used in conjunction with inventions described, in whole or in part, in the following copending application, hereby incorporated by reference as if fully set forth herein.

U.S. patent application Ser. No. 08/268,764, filed Jun. 28, 1994, in the name of inventor Julien T. Nguyen, titled "Analog Video Chromakey Mixer" now U.S. Pat. No. 5,528,309.

This copending application is referred to herein as an "incorporated disclosure".

SYSTEM ARCHITECTURE

Figure 1:
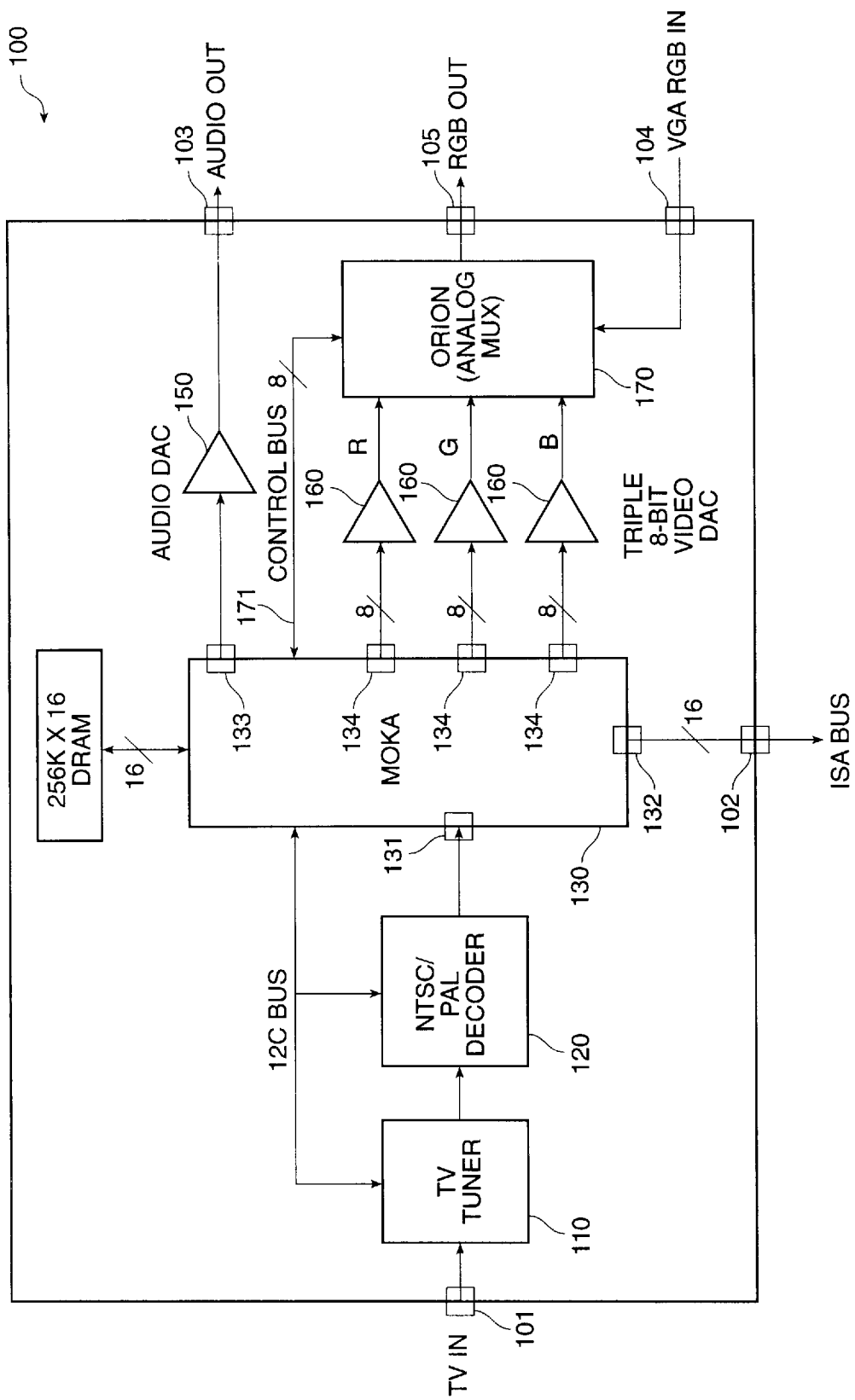
FIG. 1 shows a block diagram of a system for decoding video signals at high speed using a memory buffer.

FIG. 1 shows a block diagram of a system for decoding video signals at high speed using a memory buffer.

A system 100 comprises a analog input port 101 for receiving a television signal, preferably in the NTSC format or the PAL format. The NTSC format and the PAL format are known in the art of television. The system 100 also comprises a digital input port 102 for receiving a digital video signal, preferably in a compressed video format such as the MPEG video format. The MPEG video format is known in the art of digital video.

The television signal at the analog input port 101 is coupled to a television tuner 110, which tunes to a modulated television channel for an input television signal and outputs a baseband television signal. Alternatively, the television tuner 110 may remodulate the input television signal onto a selected carrier and output a television signal modulated by that selected carrier.

An output of the television tuner 110 is coupled to a television decoder 120, preferably an NTSC decoder (for NTSC format television signals) or a PAL decoder (for PAL format television signals), which decodes the television signal and outputs an analog video signal. The television decoder 120 preferably comprises an NTSC decoder of any standard type, or alternatively a PAL decoder of any standard type.

An output of the television decoder 120 is coupled to a video mixing circuit 130 at a video input port 131. The video mixing circuit 130 is also coupled to the digital input port 102 at a digital input port 132. The video mixing circuit 130 receives the analog video signal and the digital video signal and mixes them, to output a digital audio signal, at an audio output port 133, ultimately for coupling to a speaker for presentation, and a digital video signal, at video output ports 134, ultimately for coupling to a monitor for presentation.

The video mixing circuit 130 is coupled to a memory 140, which stores frames decoded from the digital video signal. The memory 140 preferably comprises a 256K×16 bit DRAM having an access time of about 60 nanoseconds.

The audio output port 133 is coupled to an audio D/A converter 150, which converts the digital audio signal to an analog audio signal. An output of the audio D/A converter 150 is coupled to an audio output port 103 for the system 100, for coupling to a speaker for presentation.

The video output ports 134 are coupled to video D/A converters 160, which convert the digital video signal to analog video signals. In a preferred embodiment, the digital video signal comprises an RGB format signal, and the video output ports 134 each individually comprise a part of that signal, e.g., a red (R) signal, a green (G) signal, and a blue (B) signal, each at one video output port 134.

The video output ports 134 are coupled to an analog video multiplexer 170, which is also coupled to a VGA input port 104 for receiving a VGA RGB signal. The analog video multiplexer 170 multiplexes an analog video signal output by the video output ports 134 and the VGA RGB signal, by selecting a color designated by a chromakey in the VGA RGB signal and replacing that color with selected parts of the analog video signal output by the video output ports 134, and couples its output to an RGB output port 105.

In a preferred embodiment, the analog video multiplexer 170 comprises a device like that disclosed in copending application Ser. No. 08/268,764 filed Jun. 28, 1994, in the name of inventor Julien T. Nguyen, "Analog Video Chromakey Mixer", now U.S. Pat. No. 5,528,309 an incorporated disclosure. The analog video multiplexer 170 is also coupled to the video mixing circuit 130 by means of a control bus 171, which couples control signals to the analog video multiplexer 170 as described in the incorporated disclosure.

VIDEO MIXING CIRCUIT

Figure 2:
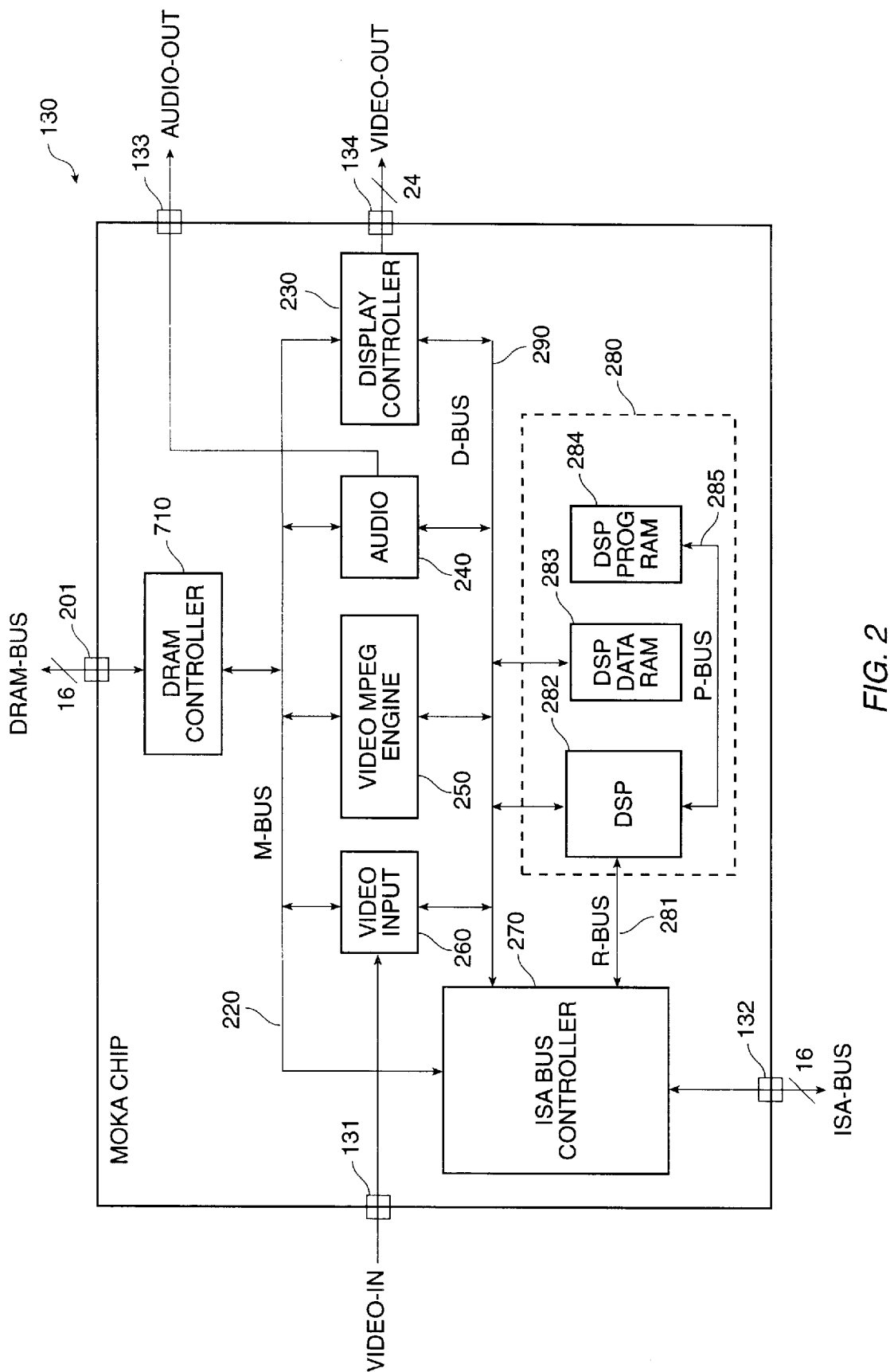
FIG. 2 shows a block diagram of a decoding circuit in a system for decoding video signals at high speed using a memory buffer.

FIG. 2 shows a block diagram of a decoding circuit in a system for decoding video signals at high speed using a memory buffer.

The video mixing circuit 130 comprises a video input port 131 coupled to an output of the television decoder 120 (FIG. 1), a digital input port 132 coupled to the digital video signal at the digital input port 102 (FIG. 1), an audio output port 133 coupled to the audio D/A converter 150 (FIG. 1), and video output ports 134 coupled to video D/A converters 160 (FIG. 1).

The video mixing circuit 130 comprises a memory bus port 201 coupled to the memory 140 (FIG. 1). The memory bus port 201 is coupled to a memory controller 210, which controls the operations of reading from the memory 140 and writing to the memory 140. Memory controllers are known in the art of computer system design.

The memory controller 210 is also coupled to an M-bus 220, which transfers addresses and data between functional elements of the video mixing circuit 130 and the memory controller 210.

The M-bus 220 is coupled to a video display controller 230, an audio block 240, a video MPEG engine 250, a video input block 260, and an ISA bus controller 270.

The video display controller 230 is also coupled to the video output ports 134, and controls display of digital video signals, ultimately to a monitor or other presentation device.

The audio block 240 is also coupled to the audio output port 133, and controls output of digital audio signals, ultimately to speaker or other presentation device.

The video MPEG engine 250 converts digital video signals input in an MPEG format, to digital video signals output in an RGB or VGA format. The MPEG, RGB, and VGA formats are all known in the art.

The video input block 260 is coupled to the video input port 131, and couples video data from the video input port 131 to the video display controller 230, ultimately for display on a presentation device such as a monitor.

The ISA bus controller 270 is coupled to the digital input port 132. The ISA bus controller 270 couples digital data input from the digital input port 132 to busses it is coupled to, and further couples digital data from those busses to the digital input port 132. In a preferred embodiment, the digital input port 132 comprises an ISA standard bus and the ISA bus controller 270 comprises a bus controller for an ISA standard bus; ISA standard busses are known in the art of computer system design.

The ISA bus controller 270 is coupled to a DSP block 280 by means of an R-bus 281.

The DSP block 280 comprises a DSP 282, a DSP data memory 283, and a DSP program memory 284.

In a preferred embodiment, the DSP 282 comprises a digital signal processor having functions known in the art of digital signal processors and digital signal processing, and having features and inventions like those described in copending application Ser. No. 08/657,555, D'Alessandro & Ritchie Docket No. SIGMA-013, filed the same day as this application in the name of inventor Yann Le Cornec, assigned to the same assignee as this application.

In a preferred embodiment, the DSP data memory 283 and the DSP program memory 284 comprise one or more random-access memories (RAM). The DSP data memory 283 is disposed for storing input data, pre-programmed constants, and intermediate values, while the DSP program memory 284 is disposed for storing program instruction words for fetching by the DSP 282. The DSP 282 is coupled to the DSP program memory 284 by means of a P-bus 285, which couples instruction words fetched by the DSP 282 from the DSP program memory 284 for interpretation and execution.

A D-bus 290 is coupled to the video display controller 230, the audio block 240, the video MPEG engine 250, the video input block 260, and the ISA bus controller 270. The D-bus 290 transfers addresses and data between functional elements of the video mixing circuit 130 and the DSP block 280, and also transfers data between the DSP 282 and the DSP data memory 283.

DECODING VIDEO SIGNALS

Figure 3:
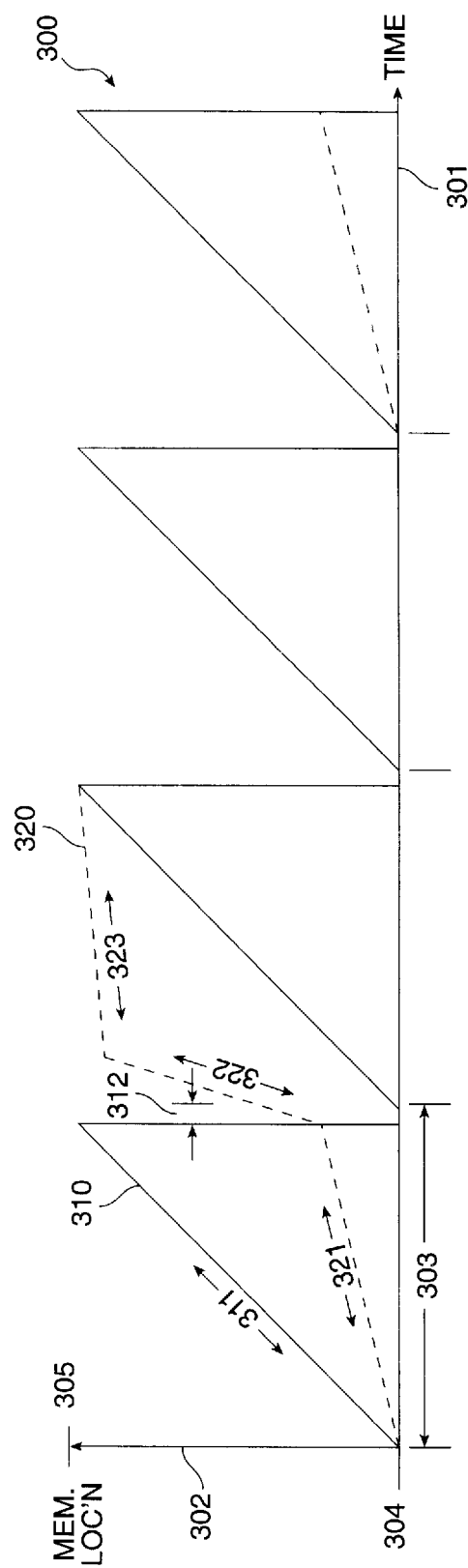
FIG. 3 shows a timing diagram for decoding video signals at high speed using a memory buffer.

FIG. 3 shows a timing diagram for decoding video signals at high speed using a memory buffer.

As MPEG signals are input from the data input port 132, they are transferred to the memory controller 210 for storage in the memory 140. Thereafter, the video MPEG engine 250 operates on MPEG data in the memory 140 and produces video data for output by the video display controller 230. The various elements of the video mixing circuit 130 couple data output from the memory 140 by means of the memory controller 210. The video display controller 230 has the highest priority (to output video data to the video output ports 134), followed by the audio block 240 (to output audio data to the audio output port 133), followed by the video MPEG engine 250 with the lowest priority (to convert MPEG data to video data).

A timing diagram 300 has an X axis 301 representing time and a Y axis 302 representing memory locations. The X axis 301 is divided into a set of frame times 303; each frame time 303 is typically about 1/72 of a second for VGA displays, but may be more or less depending on the speed of the presentation device, such as a display monitor. The Y axis represents memory locations from a lowest-valued memory location 304 for the frame to a highest-valued memory location 305 for the frame. In a preferred embodiment, the memory 140 comprises 256k 16 bit words; as MPEG picture frames are about 80k 16 bit words, this is sufficient storage for about three full picture frames.

During each frame time 303, a read pointer line 310 indicates the memory location in the memory 140 of a memory read pointer. The memory read pointer indicates which memory location is being read into the memory 140. Frames are continuously read into the memory 140 as they arrive as the video input port 131, in synchrony with horizontal and vertical synchronization signals, and are transferred to the memory 140 by the video input block 260 and the memory controller 210.

The read pointer line 310 shows that the operation of reading into memory proceeds at a constant rate for a first part 311 of each frame time 303, during which the read pointer traverses all memory locations in the memory 140. The read pointer is reset after traversing all memory locations in the memory 140. Thereafter, the operation of reading into memory is quiescent for a second part 312 of each frame time 303, including a vertical hold and blanking time.

During each frame time 303, a write pointer line 320 indicates the memory location in the memory 140 of a memory write pointer. The memory write pointer indicates which memory location is being written from the memory 140. Unlike reading frames into the memory, frames are written from the memory 140 only when transfer bandwidth is allocated from the memory 140 to the video MPEG engine 250.

During each frame time 303, the write pointer line 320 has a first slow part 321, a fast part 322, and a second slow part 323. During the first slow part 321 and the second slow part 323, the video MPEG engine 250 is "starved" for transfer bandwidth, and priority is allocated to the video display controller 230 and the audio block 240. Typically, the video display controller 230 uses nearly all of the transfer bandwidth available from the memory controller 210.

In a preferred embodiment, NTSC frames comprise about 352×240 pixels per frame and PAL frames comprise about 352×288 pixels per frame, and the transfer bandwidth of the memory controller 210 is about 22 megawords per second.

During the fast part 322, the video MPEG engine 250 is limited only by the maximum possible transfer bandwidth between it and the memory 140. In a preferred embodiment, the slope of the write pointer line 320 during the fast part 322 is about four times to five times the slope of the read pointer line 310. At these times, the video MPEG engine 250 occupies all or nearly all of the transfer bandwidth available from the memory controller 210.

Because the write pointer is controlled so the write pointer line 320 has a first slow part 321, a fast part 322, and a second slow part 323, the read pointer line 310 and the write pointer line 320 never cross, so there is no "tearing" when the video signal is displayed.

In those cases where the write pointer outpaces the read pointer, i.e., the write pointer averages a faster speed than the read pointer, one or more frame times 303 may be skipped, and the write pointer resumes at the beginning of the next frame time 303. Similarly, if a frame is to be repeated, as for example when a first video standard is converted to a second video standard, or when motion picture cine frames are converted to interleaved television frames, the frame to be repeated is re-read from the memory 140, and the write pointer resumes at the beginning of the next frame time 303.

In a preferred embodiment, the DSP 282 controls the operation of the audio block 240 and the video MPEG engine 250. The DSP 282 controls when the audio block 240 operates and when the video MPEG engine 250 skips a frame time 303.

Alternative Embodiments

Although preferred embodiments are disclosed herein, many variations are possible which remain within the concept, scope, and spirit of the invention, and these variations would become clear to those skilled in the art after perusal of this application.

We claim:

1. A system for decoding and displaying video signals, said system comprising a memory;

a memory controller coupled to said memory;

a display controller coupled to said memory controller; and a video MPEG engine coupled to said memory controller;

wherein said display controller and said video MPEG engine contend for access to said memory controller, and have relative priorities set so that said video MPEG engine operates to write to the memory buffer at a relatively slow speed during a time period when said display controller is reading from said memory buffer, and said video MPEG engine operates to write to said memory buffer at a relatively fast speed during a time period when said display controller is not reading from said memory buffer.

2. A system as in claim 1, wherein said relatively slow speed is slower than a reading speed of said display controller, and said relatively fast speed is faster than said reading speed.

3. A system as in claim 1, wherein said memory controller has a limited memory transfer bandwidth; and said display controller and said video MPEG engine are operated at speeds which completely occupy said transfer bandwidth, with said display controller given higher priority.

4. A system as in claim 1, wherein said video MPEG engine operates to decode and write a full frame to said memory buffer during each frame time.

5. A system for decoding and displaying video signals, said system comprising a memory, and a memory controller coupled to said memory;

a display controller coupled to said memory controller and coupled to a read pointer for said memory;

a video MPEG engine coupled to said memory controller and coupled to a write pointer for said memory; and means for controlling said video MPEG engine so that said write pointer advances more slowly than said read pointer for a first part of, a plurality of frame times, advances more quickly than said read pointer for a second part of said plurality of frame times, advances more slowly than said read pointer for a third part of said plurality of frame times.

6. A system as in claim 5, wherein said write pointer advances at least three times more quickly than said read pointer for said second part of said plurality of frame times.

7. A system as in claim 5, wherein said first part of said plurality of frame times correspond to times when said display controller is reading from said memory.

8. A system as in claim 5, wherein said second part of said plurality of frame times correspond to times when said display controller is not reading from said memory.

9. A system as in claim 5, wherein said third part of said plurality of frame times correspond to times when said display controller is reading from said memory.

10. A method for decoding and displaying video signals, said method comprising the steps of coupling a display controller and a video MPEG engine to a memory controller for a memory;

setting relative priorities for said display controller and said video MPEG engine so that when said display controller and said video MPEG engine contend for access to said memory controller, said video MPEG engine operates to write to the memory buffer at a relatively slow speed during a time period when said display controller is reading from said memory buffer, and said video MPEG engine operates to write to said memory buffer at a relatively fast speed during a time period when said display controller is not reading from said memory buffer.

11. A method as in claim 10, wherein said relatively slow speed is slower than a reading speed of said display controller, and said relatively fast speed is faster than said reading speed.

12. A method as in claim 10, comprising the steps of operating said display controller and said video MPEG engine at such speeds that said display controller and said video MPEG engine collectively occupy substantially all of a limited memory transfer bandwidth available from said memory controller; and setting a priority of said display controller higher than a priority of said video MPEG engine.

13. A method as in claim 10, comprising the step of operating said video MPEG engine to decode and write a full frame to said memory buffer during each frame time.

14. A method for decoding and displaying video signals, said method comprising the steps of coupling a memory controller to a memory;

coupling a display controller to said memory controller and to a read pointer for said memory;

coupling a video MPEG engine to said memory controller and to a write pointer for said memory; and controlling said video MPEG engine so that said write pointer advances more slowly than said read pointer for a first part of a plurality of frame times, advances more quickly than said read pointer for a second part of said plurality of frame times, advances more slowly than said read pointer for a third part of said plurality of frame times.

15. A method as in claim 14, wherein said write pointer advances at least three times more quickly than said read pointer for said second part of said plurality of frame times.

16. A method as in claim 14, wherein said first part of said plurality of frame times correspond to times when said display controller is reading from said memory.

17. A method as in claim 14, wherein said second part of said plurality of frame times correspond to times when said display controller is not reading from said memory.

18. A method as in claim 14, wherein said third part of said plurality of frame times correspond to times when said display controller is reading from said memory.

* * * * *